(12) United States Patent
Matsumoto

(10) Patent No.: US 9,473,001 B2
(45) Date of Patent: Oct. 18, 2016

(54) BRUSHLESS MOTOR FAN WITH STATOR INSULATOR HAVING VENTILATION RECESSES AND GROOVES

(71) Applicant: PANASONIC CORPORATION, Osaka (JP)

(72) Inventor: Hiroshi Matsumoto, Siga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 439 days.

(21) Appl. No.: 13/675,378

(22) Filed: Nov. 13, 2012

(65) Prior Publication Data
US 2013/0127303 A1 May 23, 2013

(30) Foreign Application Priority Data

Nov. 21, 2011 (JP) .................. 2011-253565

(51) Int. Cl.
*H02K 9/06* (2006.01)
*H02K 5/08* (2006.01)
(Continued)

(52) U.S. Cl.
CPC ...... *H02K 9/06* (2013.01); *H02K 3/24* (2013.01); *H02K 3/522* (2013.01); *H02K 5/08* (2013.01)

(58) Field of Classification Search
CPC ........ H02K 1/165; H02K 3/345; H02K 1/20; H02K 9/06; H02K 3/24; H02K 9/04; H02K 3/522
USPC ............ 310/43, 45, 60 R, 194, 214, 215, 58
IPC ....................................................... H02K 9/06
See application file for complete search history.

(56) References Cited

U.S. PATENT DOCUMENTS

| | | | |
|---|---|---|---|
| 2002/0130582 A1* | 9/2002 | Oketani ................. | H02K 3/345 310/216.004 |
| 2004/0046477 A1* | 3/2004 | Kuroyanagi ........... | H02K 15/10 310/215 |

(Continued)

FOREIGN PATENT DOCUMENTS

| | | |
|---|---|---|
| CN | 1462498 | 12/2003 |
| GB | 182898 | 7/1922 |

(Continued)

OTHER PUBLICATIONS

Machine Translation of JP 2006-050752 A.*

(Continued)

*Primary Examiner* — John K Kim
(74) *Attorney, Agent, or Firm* — Greenblum & Bernstein, P.L.C.

(57) ABSTRACT

A cooling structure for a brushless motor, which includes a stator, a rotor, and a motor shaft arranged integrally with the rotor. The stator includes a stator core including an inner circumferential surface, a cylindrical portion including first and second end surfaces adjacent to the inner circumferential surface, and teeth projecting from the inner circumferential surface. An insulator covers the inner circumferential surface, the first and second end surfaces, and the teeth. A coil is wound around each tooth that is covered by the insulator. The cooling structure includes a cooling fan coupled to one end of the motor shaft and arranged closer to the second end surface than the first end surface. At least one ventilation recess is arranged between two adjacent ones of the teeth in the circumferential direction in a portion of the insulator that covers the first end surface.

2 Claims, 3 Drawing Sheets

(51) Int. Cl.
*H02K 3/24* (2006.01)
*H02K 3/52* (2006.01)

(56) References Cited

U.S. PATENT DOCUMENTS

| | | | |
|---|---|---|---|
| 2004/0056548 A1 | 3/2004 | Tanaka et al. | |
| 2004/0061408 A1* | 4/2004 | Grant et al. | 310/217 |
| 2004/0232785 A1* | 11/2004 | Yamada et al. | 310/71 |
| 2009/0324435 A1* | 12/2009 | Sears et al. | 417/423.7 |
| 2010/0289372 A1* | 11/2010 | Taniguchi | H02K 3/28 310/195 |

FOREIGN PATENT DOCUMENTS

| | | | | |
|---|---|---|---|---|
| GB | 722152 A * | 1/1955 | | H02K 3/24 |
| JP | 10-174356 | 6/1998 | | |
| JP | 2000-050572 | 2/2000 | | |
| JP | 2004-23806 | 1/2004 | | |
| JP | 2005-261083 | 9/2005 | | |
| JP | 2006-006047 | 1/2006 | | |
| JP | 2006050752 A * | 2/2006 | | H02K 3/24 |
| JP | 2008-054391 | 3/2008 | | |
| JP | 2010093905 A * | 4/2010 | | H02K 29/08 |
| JP | 4782888 | 7/2011 | | |
| JP | 2011-166857 A * | 8/2011 | | H02K 3/46 |

OTHER PUBLICATIONS

Machine Translation of JP 2010-050752 A.*
Machine Translation of JP 2011-166857 A.*
China Office action, dated Oct. 10, 2014 along with an English translation thereof.
Search Report issued by E.P.O. patent office in E.P.O. Patent Application No. 12192236.3, dated Dec. 23, 2015.

* cited by examiner

BRUSHLESS MOTOR FAN WITH STATOR INSULATOR HAVING VENTILATION RECESSES AND GROOVES

CROSS-REFERENCE TO RELATED APPLICATIONS

This application is based upon and claims the benefit of priority from prior Japanese Patent Application No. 2011-253565, filed on Nov. 21, 2011, the entire contents of which are incorporated herein by reference.

BACKGROUND OF THE ART

The present invention relates to a cooling structure that releases heat from a brushless motor.

Japanese Laid-Open Patent Publication No. 2008-54391 proposes a cooling structure that releases heat from a brushless motor.

The brushless motor described in Japanese Laid-Open Patent Publication No. 2008-54391 includes a stator, a rotor rotated in the stator, and a motor shaft arranged integrally with the rotor. A cooling fan is coupled to the motor shaft to draw ambient air into the stator. This dissipates the heat generated by the brushless motor.

The stator includes a stator core, an insulator, and a coil. The stator core includes a cylindrical portion and teeth extending from an inner circumferential surface of the cylindrical portion. The insulator covers the inner circumferential surface of the cylindrical portion, first and second end surfaces that are adjacent to the inner circumferential surface, and the teeth. The coil is wound around the teeth that are covered by the insulator.

The brushless motor includes exposed portions that expose the inner circumferential surface of the cylindrical portion from the insulator between adjacent ones of the teeth in the circumferential direction. This increases the heat radiation efficiency of the cooling fan.

However, the exposed portions, which are not covered by the insulator, in the inner circumferential surface of the cylindrical portion in the stator core may adversely affect the insulation performance.

SUMMARY OF THE INVENTION

One aspect of the present invention is a cooling structure for a brushless motor. The brushless motor includes a stator, a rotor rotated in the stator, and a motor shaft arranged integrally with the rotor. The stator includes a stator core including an inner circumferential surface, a cylindrical portion including first and second end surfaces, which are adjacent to the inner circumferential surface, a plurality of teeth projecting from the inner circumferential surface, an insulator that covers the inner circumferential surface, the first and second end surfaces, and the teeth, and a coil wound around each tooth that is covered by the insulator. The cooling structure includes a cooling fan coupled to one end of the motor shaft and arranged closer to the second end surface than the first end surface. At least one ventilation recess is arranged between two adjacent ones of the teeth in the circumferential direction in a portion of the insulator that covers the first end surface.

A further aspect of the present invention is a brushless motor provided with a cooling structure. The brushless motor includes a stator, a rotor rotated in the stator, a motor shaft arranged integrally with the rotor, and a cooling fan coupled to one end of the motor shaft. The stator includes a stator core including an inner circumferential surface, a cylindrical portion including first and second end surfaces that are adjacent to the inner circumferential surface, and a plurality of teeth projecting from the inner circumferential surface. The second end surface is closer to the cooling fan than the first end surface. An insulator covers the inner circumferential surface, the first and second end surfaces, and the teeth. A coil is wound around each tooth that is covered by the insulator. The insulator includes, at a portion covering the first end surface, at least one ventilation recess arranged between two adjacent ones of the teeth in a circumferential direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

The present invention will now be described with reference to the accompanying drawings.

A brushless motor of the present embodiment is applied to a power tool such as an impact driver.

Figure 1A:
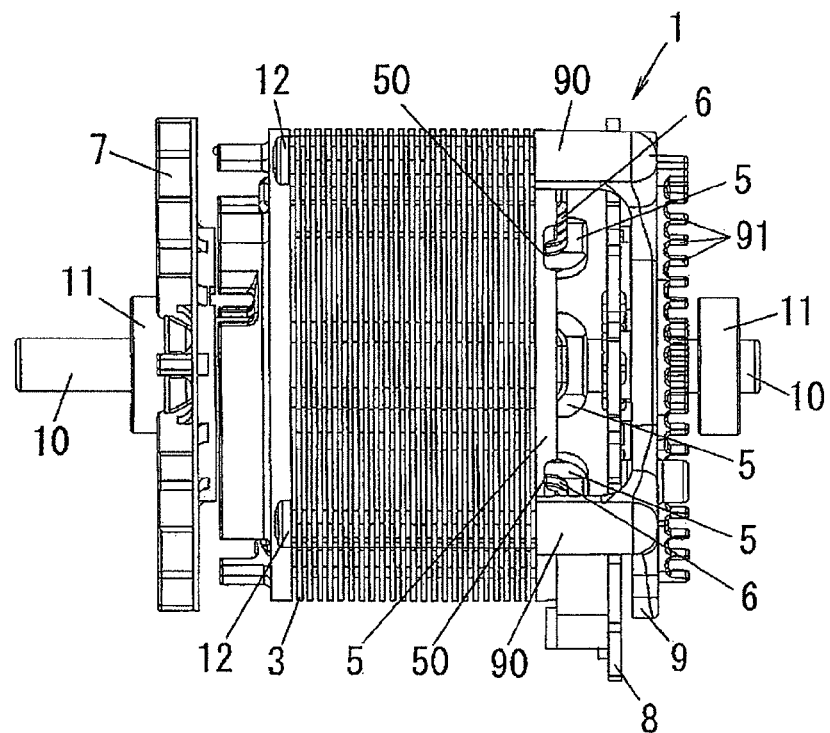
FIG. 1A is a front view showing a brushless motor according to one embodiment of the present invention.
Figure 1B:
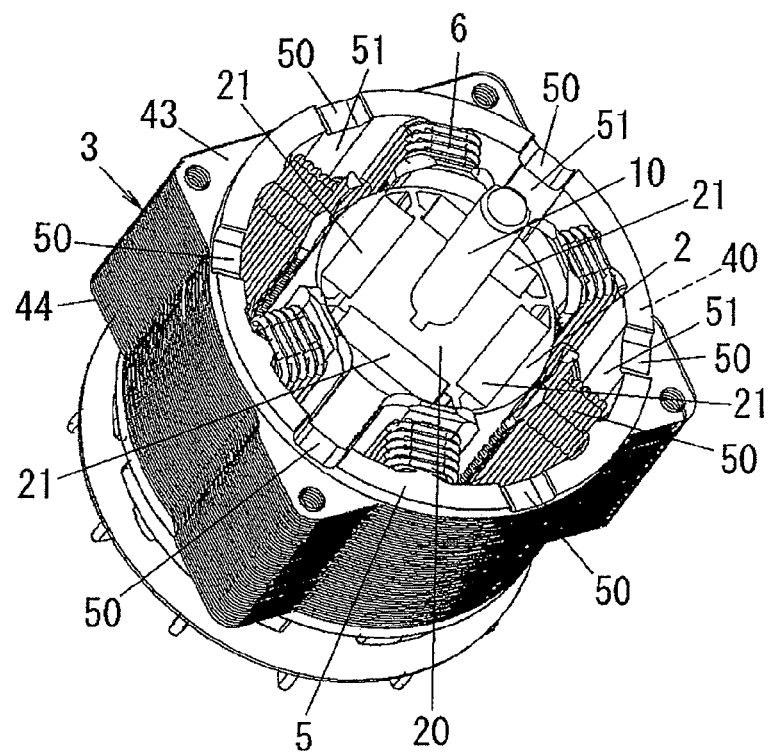
FIG. 1B is a perspective view showing the brushless motor without a circuit board and heat sink.
Figure 2:
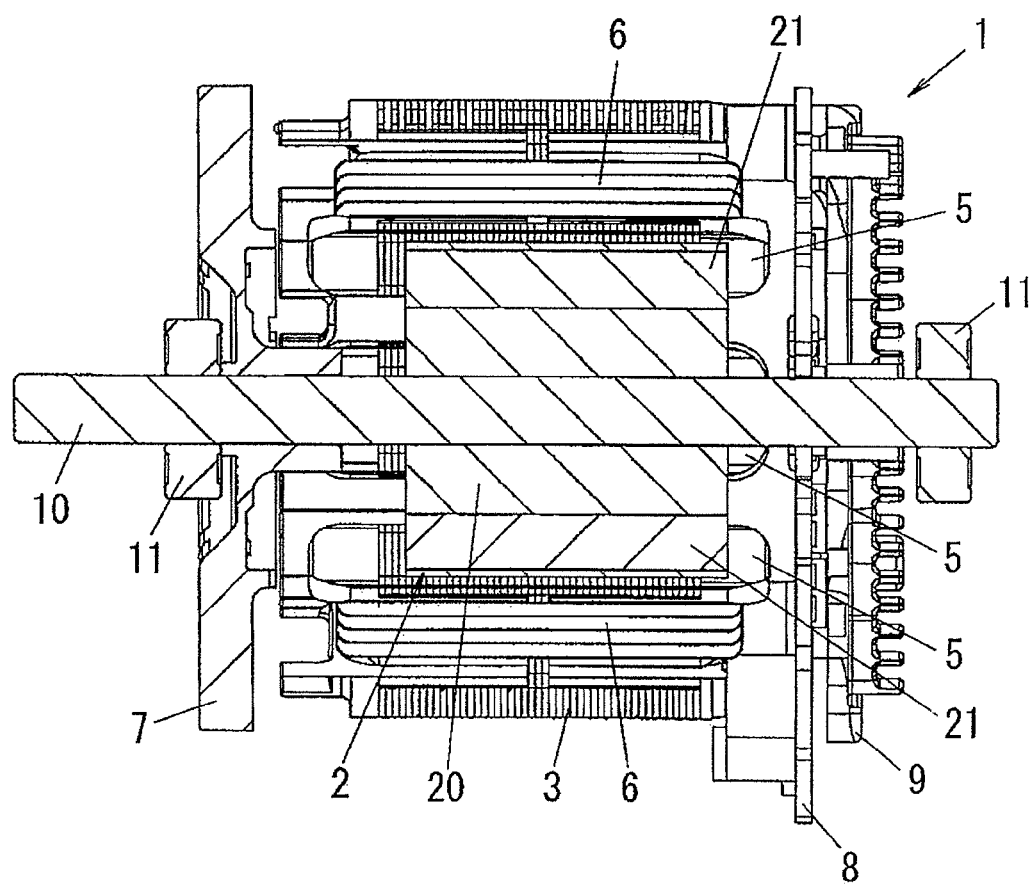
FIG. 2 is a front view showing the brushless motor.
Figure 3:
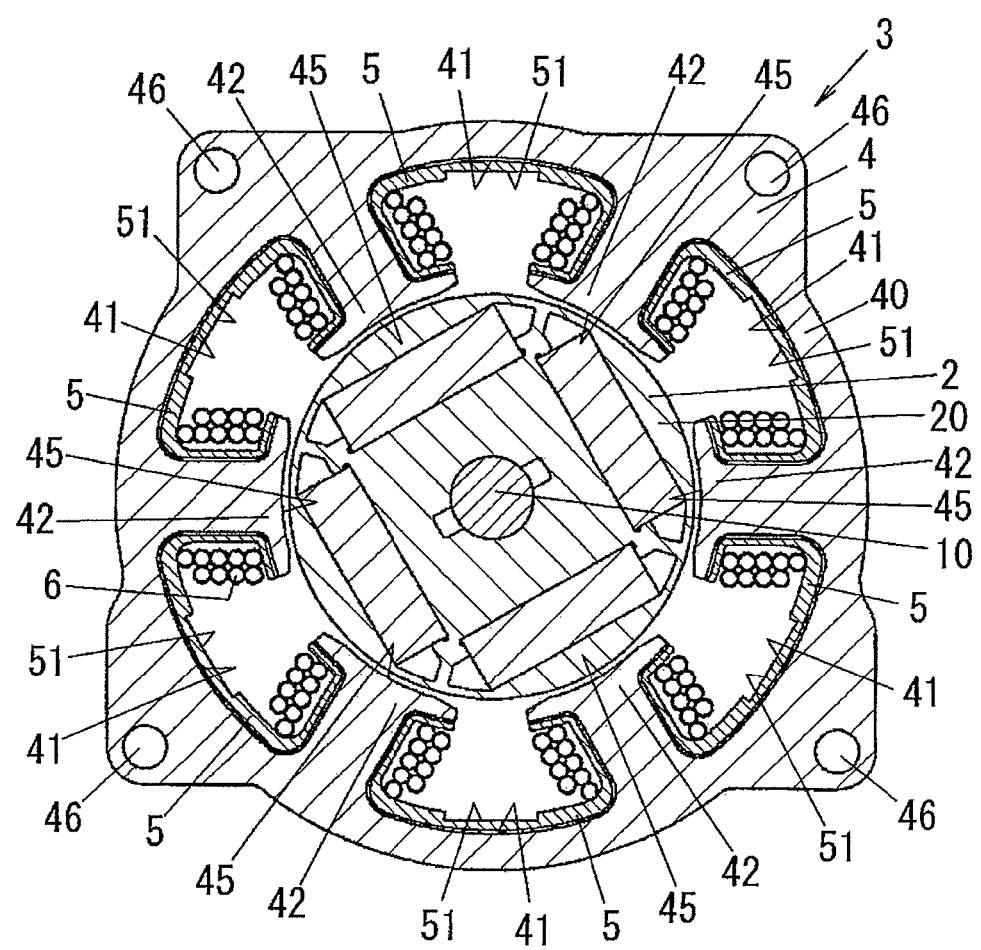
FIG. 3 is a plan view showing the brushless motor.

As shown in FIGS. 1B and 2, the brushless motor 1 includes a stator 3 and a rotor 2, which is arranged in the stator 3. The rotor 2 includes a cylindrical rotor core 20, a motor shaft 10, and four magnets 21. The motor shaft 10 extends through a central portion of the rotor core 20 and is arranged integrally with the rotor core 20. The four magnets 21 are fixed inside the rotor core 20. The rotor core 20 includes a plurality of laminated circular thin plates. As shown in FIG. 3, the four magnets 21 are arranged at predetermined intervals. The motor shaft 10 includes two ends (first and second ends) that are each rotatably supported by a bearing 11. A cooling fan 7, which generates a flow of air in the axial direction of the motor shaft 10, is integrally coupled to the second end (left end as viewed in FIG. 1A) of the motor shaft 10. In the present embodiment, the cooling fan 7 generates a flow of air in a direction extending from the first end (right end as viewed in FIG. 1A) to the second end. However, the flow of air may be generated in the opposite direction.

A circuit board 8 and a heat sink 9 are arranged on a first end surface 43 of the stator 3 proximal to the first end (right side as viewed in FIG. 1A) of the motor shaft 10. The heat sink 9 is fixed by fasteners 12, such as screws, to the first end surface 43 of the stator 3. The circuit board 8 is fastened by screws or the like to the heat sink 9. As shown in FIG. 1A, the circuit board 8 is spaced apart by a predetermined clearance from the first end surface 43 of the stator 3 toward the first end of the motor shaft 10. The heat sink 9 includes legs 90, which project toward the first end surface 43 of the stator 3, and a large number of fins 91, which project toward the first end of the motor shaft 10. The fasteners 12 are fastened to the legs 90.

As shown in FIG. 3, the stator 3 includes a stator core 4, an insulator 5, and coils 6. The stator core 4 includes an inner circumferential surface 41, a cylindrical portion 40, and a plurality of (six as shown in the drawing) teeth 42. The cylindrical portion 40 includes first and second end surfaces 43 and 44, which are adjacent to the inner circumferential surface 41. The teeth 42 project from the inner circumferential surface 41 of the cylindrical portion 40 in the radial direction toward the center of the cylindrical portion 40. The six teeth 42 are arranged on the inner circumferential surface at predetermined equal intervals in the circumferential direction. As shown in FIGS. 1B and 3, the insulator 5 covers the first and second end surfaces 43 and 44 of the cylindrical portion 40 and the inner circumferential surface 41 of the cylindrical portion 40. Each tooth 42 includes a distal surface 45 facing toward the rotor 2. The insulator 5 also covers the teeth 42 excluding the distal surfaces 45. A coil 6 is wound around each tooth 42, which is covered by the insulator 5. The circuit board 8 controls the supply of power to the coils 6. Further, the circuit board 8 includes a magnetic sensor (not shown) that detects the positions of the magnetic poles in the rotor 2. In accordance with the detection of the magnetic sensor, the circuit board 8 controls the supply of power to the coils 6 and rotates the rotor 2 (motor shaft 10).

The stator core 4 includes a plurality of laminated thin steel plates. A positioning hole 46 is arranged in each of four corners of the thin steel plates, which form the stator core 4. The fasteners 12 are inserted through the positioning holes 46 thereby integrating the thin steel plates.

The insulator 5 that covers the stator core 4 will now be described in further detail.

The insulator 5 electrically insulates the stator core 4 and is formed from a synthetic resin. As shown in FIG. 1B, the portion of the insulator 5 covering the first end surface 43 of the cylindrical portion 40 proximal to the first end of the motor shaft 10 (circuit board 8) includes a plurality of (six in the present embodiment) ventilation recesses 50 that extend toward the second end of the motor shaft 10 (cooling fan 7). In the present embodiment, the portion of the insulator 5 covering the first end surface 43 is annular. In the annular portion of the insulator 5, each ventilation recess 50 is arranged between two adjacent ones of the teeth 42 in the circumferential direction of the cylindrical portion 40 of the stator core 4. The annular portion of the insulator 5 may include at least one ventilation recess 50 arranged between any of two adjacent ones of the teeth 42 in the circumferential direction.

In the present embodiment, as shown in FIGS. 1B and 3, the portion of the insulator 5 covering the inner circumferential surface 41 of the cylindrical portion 40 includes ventilation grooves 51 that extend toward the inner circumferential surface 41 in the radial direction of the cylindrical portion 40. Each ventilation groove 51 is arranged between two adjacent ones of the teeth 42 in the circumferential direction. The ventilation grooves 51 extend along the entire length of the cylindrical portion 40 in the axial direction of the cylindrical portion 40. In the present embodiment, six ventilation grooves 51 are formed continuously with the six ventilation recesses 50, respectively. In the portion of the insulator 5 covering the inner circumferential surface 41, at least one ventilation groove 51 may be arranged between any of two adjacent ones of the teeth 42 in the circumferential direction.

Heat is released from the brushless motor 1 of the present embodiment as described below.

The circuit board 8 controls the supply of power to rotate the rotor 2. Here, the motor shaft 10 rotates together with the rotor 2. This rotates the cooling fan 7, which is coupled integrally with the motor shaft 10, and generates a flow of air along the motor shaft 10 directed from the circuit board 8 toward the cooling fan 7.

In the present embodiment, the insulator 5 that covers the first end surface 43 of the stator core 4 includes the ventilation recesses 50 that extend toward the cooling fan 7. Each ventilation recess 50 enlarges the clearance between the circuit board 8 and the stator 3 through which ambient air flows. Thus, the amount of ambient air drawn through the clearance is increased. In the present embodiment, at least one ventilation recess 50 is arranged between any of two adjacent ones of the teeth 42. The ventilation recess 50 is continuous with an air passage formed between the corresponding teeth 42. Thus, ambient air can be smoothly drawn into the air passage. In this manner, an increased amount of ambient air can be smoothly drawn into the stator 3. This efficiently dissipates heat from the brushless motor 1, especially, the circuit board 8.

In the present embodiment, the portion of the insulator 5 covering the inner circumferential surface 41 of the stator core 4 includes the ventilation grooves 51, which extend toward the inner circumferential surface 41 in the radial direction and along the entire length of the cylindrical portion 40 in the axial direction. Each ventilation groove 51 increases the flow area of the air passage between the corresponding teeth 42. Thus, ambient air can be smoothly drawn into the stator 3. This efficiently dissipates heat from the brushless motor 1, especially, the coils 6.

Further, in the present embodiment, the ventilation recesses 50 are continuous with the ventilation grooves 51 between the corresponding teeth 42. Thus, ambient air is smoothly drawn from the ventilation recesses 50 to the ventilation grooves 51. This also increases the efficiency for dissipating heat from the brushless motor 1.

In the present embodiment, the brushless motor 1 including the cooling structure includes the stator 3, the rotor 2 that rotates in the stator 3, the motor shaft 10 that is arranged integrally with the rotor 2, and the cooling fan coupled to one end of the motor shaft 10. The stator 3 includes the stator core 4, the insulator 5, and the coil 6. The stator core 4 includes the cylindrical portion 40, which includes the inner circumferential surface 41 and the first and second end surfaces 43 and 44 that are adjacent to the inner circumferential surface 41, and the teeth 42 that project from the inner circumferential surface 41 of the cylindrical portion 40. The second end surface is arranged closer to the cooling fan 7 than the first end surface. The insulator 5 covers the inner circumferential surface 41 of the cylindrical portion 40, the first and second end surfaces 43 and 44, and the teeth 42. The coils 6 are wound around the teeth 42, which are covered by the insulator 5. The portion of the insulator 5 covering the first end surface 43 includes at least one ventilation recess 50 arranged between two adjacent ones of the teeth 42 in the circumferential direction. In this manner, the cooling structure of the brushless motor 1 in the present embodiment includes the cooling fan 7, which is coupled to one end of the motor shaft 10 and arranged closer to the second end surface 44 than the first end surface 43, and the at least one ventilation recess 50, which is arranged between two adjacent ones of the teeth 42 in the circumferential direction.

In this manner, in the present embodiment, the portion of the insulator 5 that covers the first end surface 43, which is located farther from the cooling fan 7 than the second end surface 44, includes the ventilation recess 50 that increases the amount of air that can pass through this location. At least one ventilation recess 50 is located between two of the teeth 42 that are adjacent in the circumferential direction. Thus, the air can smoothly pass through the air passage that is formed between two adjacent ones of the teeth 42 and the ventilation recess 50 that is continuous with the air passage. As a result, the present invention easily draws in ambient air with a simple structure and thereby enhances the dissipation of heat from the brushless motor 1.

Further, in the cooling structure of the brushless motor 1 in the present embodiment, the portion of the insulator 5 covering the inner circumferential surface 41 includes at least one ventilation groove 51 that extends along the axial direction of the cylindrical portion 40 between two adjacent ones of the teeth 42 in the circumferential direction.

In this manner, in the present embodiment, the ventilation groove 51 increase the flow area of the air passage formed between the two adjacent ones of the teeth 42 in the circumferential direction. This increases the amount of air that can be drawn into the cylindrical portion 40 and enhances the dissipation of heat from the brushless motor.

In a further embodiment, the brushless motor 1 may include the ventilation recess 50 and the ventilation groove 51 may be omitted. Further, the ventilation recess 50 and the ventilation groove 51 may be arranged at one to five locations in the brushless motor 1.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A cooling structure for a brushless motor, wherein the brushless motor includes a stator, a rotor rotated in the stator, and a motor shaft arranged integrally with the rotor, the stator includes a stator core including an inner circumferential surface, a cylindrical portion including first and second end surfaces, which are adjacent to the inner circumferential surface, a plurality of teeth projecting from the inner circumferential surface, an insulator that covers the inner circumferential surface, the first and second end surfaces, and the teeth, and a coil wound around each tooth that is covered by the insulator, wherein the teeth include a pair of teeth that are adjacent in the circumferential direction the cooling structure comprising:
a cooling fan coupled to one end of the motor shaft and arranged closer to the second end surface than the first end surface; and
at least one ventilation recess arranged only at a central portion between the two teeth of the pair in a portion of the insulator that covers the first end surface,
further comprising at least one ventilation groove extending in an axial direction of the cylindrical portion and arranged between the two teeth in a portion of a surface the insulator that covers the inner circumferential surface,
wherein the at least one ventilation recess and the at least one ventilation groove are formed continuously between the two teeth in the circumferential direction.

2. A brushless motor provided with a cooling structure, the brushless motor comprising:
a stator;
a rotor rotated in the stator;
a motor shaft arranged integrally with the rotor; and
a cooling fan coupled to one end of the motor shaft, wherein
the stator includes
a stator core including an inner circumferential surface, a cylindrical portion including first and second end surfaces that are adjacent to the inner circumferential surface, and a plurality of teeth projecting from the inner circumferential surface, wherein the second end surface is closer to the cooling fan than the first end surface, and the teeth include a pair of teeth that are adjacent in the circumferential direction,
an insulator that covers the inner circumferential surface, the first and second end surfaces, and the teeth, and
a coil wound around each tooth that is covered by the insulator, and
the insulator includes, at a portion covering the first end surface, at least one ventilation recess arranged only at a central portion between the two teeth of the pair,
wherein the insulator includes, at a portion of a surface covering the inner circumferential surface, at least one ventilation groove extending in an axial direction of the cylindrical portion between the two teeth,
wherein the at least one ventilation recess and the at least one ventilation groove are formed continuously between the two teeth.

\* \* \* \* \*